United States Patent
Bai et al.

(10) Patent No.: US 10,490,075 B2
(45) Date of Patent: Nov. 26, 2019

(54) SYSTEM AND METHOD FOR PROVIDING ROAD USER RELATED DATA BASED ON VEHICLE COMMUNICATIONS

(71) Applicant: Honda Motor Co., Ltd., Tokyo (JP)

(72) Inventors: Xue Bai, Novi, MI (US); Ehsan Moradi-Pari, West Bloomfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 15/822,719

(22) Filed: Nov. 27, 2017

(65) Prior Publication Data

US 2019/0164423 A1    May 30, 2019

(51) Int. Cl.
| | |
|---|---|
| *G08G 1/09* | (2006.01) |
| *G08G 1/0967* | (2006.01) |
| *G08G 1/16* | (2006.01) |
| *H04W 4/04* | (2009.01) |
| *G08G 1/00* | (2006.01) |
| *B60W 30/16* | (2012.01) |

(52) U.S. Cl.
CPC ....... *G08G 1/096791* (2013.01); *B60W 30/16* (2013.01); *G08G 1/163* (2013.01); *G08G 1/166* (2013.01); *G08G 1/20* (2013.01); *H04W 4/046* (2013.01); *B60W 2550/408* (2013.01)

(58) Field of Classification Search
CPC .......... G08G 1/017; G08G 1/61; G08G 1/163; G08G 1/166
USPC .................................................. 340/901–905
See application file for complete search history.

(56) References Cited

U.S. PATENT DOCUMENTS

| | | | |
|---|---|---|---|
| 8,954,226 B1 | 2/2015 | Binion et al. | |
| 2014/0320316 A1* | 10/2014 | Peri | G08G 1/08 340/907 |
| 2015/0353008 A1* | 12/2015 | Kline | B60W 40/04 340/993 |
| 2016/0223643 A1 | 8/2016 | Li et al. | |
| 2016/0267781 A1* | 9/2016 | Papay | G08C 17/02 |
| 2016/0375905 A1 | 12/2016 | Park et al. | |

(Continued)

FOREIGN PATENT DOCUMENTS

WO    2017122976    7/2017

OTHER PUBLICATIONS

Qualcomm and LG Bring 5G and Cellular-V2X Communications Into Vehicles, Feb. 23, 2017. https://www.qualcomm.com/news/releases/2017/02/23/qualcomm-and-lg-bring-5g-and-cellular-v2x-communications-vehicles.

(Continued)

*Primary Examiner* — Joseph H Feild
*Assistant Examiner* — Sharmin Akhter
(74) *Attorney, Agent, or Firm* — Rankin, Hill & Clark LLP

(57) ABSTRACT

A system and method for providing road user related data based on vehicle communications that include detecting at least one road user located within a surrounding environment of a vehicle. The system and method also include sending vehicle communication signals to the at least one road user detected within the surrounding environment of the vehicle. The system and method additionally include receiving reflected vehicle communication signals that are reflected back from the at least one road user. The system and method further include analyzing the reflected vehicle communication signals to determine a received signal strength of each of the reflected vehicle communication signals.

20 Claims, 6 Drawing Sheets

(56) References Cited

U.S. PATENT DOCUMENTS

| | | |
|---|---|---|
| 2017/0018187 A1 | 1/2017 | Kim et al. |
| 2017/0075355 A1 | 3/2017 | Micks et al. |
| 2017/0113664 A1 | 4/2017 | Nix |
| 2017/0315215 A1* | 11/2017 | Berezin .................. G01S 7/412 |

OTHER PUBLICATIONS

Zaki, Maged; Accelerating C-V2X toward 5G for autonomous driving; Feb. 24, 2017; https://www.qualcomm.com/news/onq/2017/02/24/accelerating-c-v2x-toward-5g-autonomous-driving.

* cited by examiner

SYSTEM AND METHOD FOR PROVIDING ROAD USER RELATED DATA BASED ON VEHICLE COMMUNICATIONS

BACKGROUND

Currently many vehicles utilize radar based systems to determine relative locations, positions, and/or speeds of one or more additional vehicles that are located within a predetermined vicinity of the vehicles. As this technology is being utilized at a higher rate by more vehicles, a major limitation of these technologies is that they may be susceptible to interference. In particular, as more vehicles utilize radar to determine the relative locations, positions, and/or speeds of objects such as other vehicles, radar interference may become more and more prevalent thereby omitting data in certain circumstances. The radar additionally may only allow half-duplex based communications, thereby causing delay and uncertainties in calculations regarding object detection. For example, in high traffic circumstances, radar inference may preclude the reception of radar information such that the relative locations, positions, and/or speeds of other vehicles may not be determined. This may cause a lapse in the provision of data that is used by one or more systems that may be utilized in the vehicles.

BRIEF DESCRIPTION

According to one aspect, a computer-implemented method for providing road user related data based on vehicle communications that includes detecting at least one road user located within a surrounding environment of a vehicle. The computer-implemented method also includes sending vehicle communication signals to the at least one road user detected within the surrounding environment of the vehicle. The vehicle communication signals are sent from the vehicle through at least one vehicle communications transceiver. The computer-implemented method additionally includes receiving reflected vehicle communication signals that are reflected back from the at least one road user. The computer-implemented method further includes analyzing the reflected vehicle communication signals to determine a received signal strength of each of the reflected vehicle communication signals. The received signal strength of each of the reflected vehicle communication signals are analyzed to determine attributes associated with the at least one road user relative to the vehicle.

According to another aspect, a system for providing road user related data based on vehicle communications that includes a memory storing instructions when executed by a processor cause the processor to detect at least one road user located within a surrounding environment of a vehicle. The instructions also cause the processor to send vehicle communication signals to the at least one road user detected within the surrounding environment of the vehicle. The vehicle communication signals are sent from the vehicle through at least one vehicle communications transceiver. The instructions additionally cause the processor to receive reflected vehicle communication signals that are reflected back from the at least one road user. The instructions further cause the processor to analyze the reflected vehicle communication signals to determine a received signal strength of each of the reflected vehicle communication signals. The received signal strength of each of the reflected vehicle communication signals are analyzed to determine attributes associated with the at least one road user relative to the vehicle.

According to still another aspect, a computer readable storage medium storing instructions that when executed by a computer, which includes at least a processor, causes the computer to perform a method that includes detecting at least one road user located within a surrounding environment of a vehicle. The instructions also include sending vehicle communication signals to the at least one road user detected within the surrounding environment of the vehicle. The vehicle communication signals are sent from the vehicle through at least one vehicle communications transceiver. The instructions additionally include receiving reflected vehicle communication signals that are reflected back from the at least one road user. The instructions further include analyzing the reflected vehicle communication signals to determine a received signal strength of each of the reflected vehicle communication signals. The received signal strength of each of the reflected vehicle communication signals are analyzed to determine attributes associated with the at least one road user relative to the vehicle.

DETAILED DESCRIPTION

Figure 1:
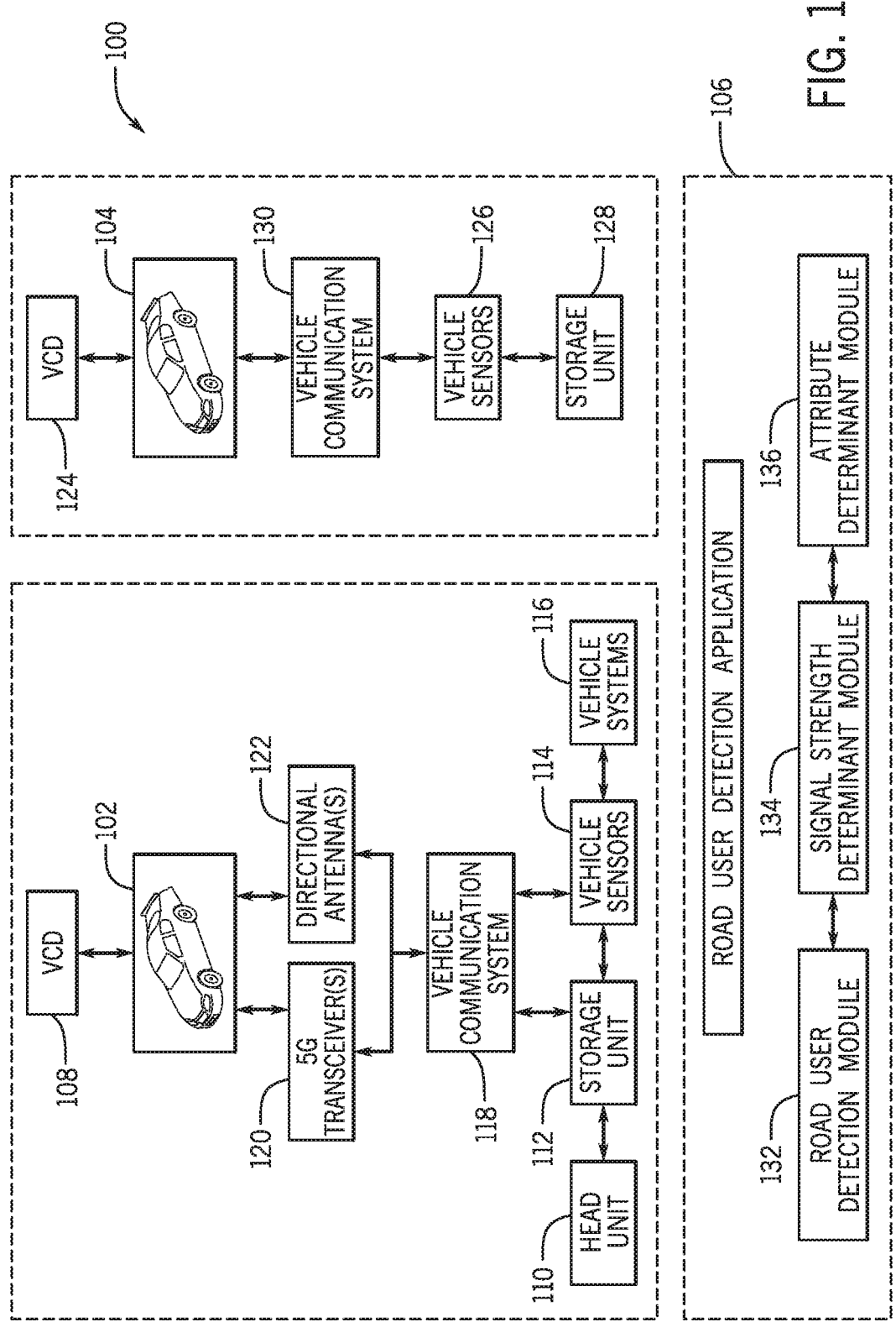
FIG. 1 is a schematic view of an operating environment for providing road user related data based on vehicle communications according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers. The portable device may additionally include a wearable computing device that includes, but is not limited to, a computing device component (e.g., a processor) with circuitry that can be worn by and/or in possession of a user. Exemplary wearable computing devices can include, but are not limited to, watches, glasses, clothing, gloves, hats, shirts, jewelry, rings, earrings necklaces, armbands, shoes, earbuds, headphones and personal wellness devices.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

I. System Overview

The systems and methods described herein are generally directed to providing road user related data based on 5G using a vehicle communications network. In an exemplary embodiment, the vehicle communications network may utilize one or more V2X communications protocols to send and receive one or more vehicle communication signals that may be implemented using, but may not be limited to, vehicle-to-everything (V2X) communication in the form of a vehicle-to-vehicle (V2V) communication protocol, a vehicle-to-infrastructure (V2I) communication protocol, and a V2X communication protocol. In some embodiments, the vehicle communication may be implemented using Dedicated Short Range Communications (DSRC). It is understood that the V2X communications protocols described herein may be implemented with any communication or network protocol, for example, ad hoc networks, wireless access within the vehicle, cellular networks, Wi-Fi networks (e.g., IEEE 802.11), Bluetooth®, among others.

As discussed below, the system and methods may specifically utilize 5th generation wireless signaling technology (5G) based vehicle communication signals (e.g., V2V communication signals) to provide a full duplex capability of sending and receiving of vehicle communication signals. The sending of the vehicle signals and the receiving of reflected vehicle communication signals on 5G bands may enable quick and efficient detection of one or more objects that may include road users that are located within a surrounding environment of a host vehicle. This functionality may enable efficient determination of attributes associated with the one or more road users that may be used to supplement radar data during one or more circumstances, including when radar interference affects radar data being received by the host vehicle. Additionally, this functionality may ensure that the host vehicle may receive attributes associated with the road users and/or additional objects that may be utilized by one or more systems of the host vehicle.

Referring now to the drawings, wherein the showings are for purposes of illustrating one or more exemplary embodiments and not for purposes of limiting the same, FIG. 1 is a schematic view of an operating environment 100 for providing road user related data based on vehicle communications according to an exemplary embodiment. The components of the environment 100, as well as the components of other systems, hardware architectures, and software architectures discussed herein, may be combined, omitted, or organized into different architectures for various embodiments.

Generally the environment 100 may include the host vehicle (vehicle) 102 and one or more objects that may include one or more road users (road user) that may be located within the surrounding environment of the vehicle 102. In one or more embodiments, the surrounding environment of the vehicle 102 may include a dynamic vicinity (e.g., predetermined) around the vehicle 102 that may be change based on one or more roadways that are being traveled by the vehicle 102 and/or are located a dynamically changing distance from the vehicle 102. For example, the surrounding environment of the vehicle 102 may include roadways that form a traffic intersection at which the vehicle 102 is located.

In an exemplary embodiment, the vehicle 102 may execute a road user detection application 106. As discussed in more detail below, the road user detection application 106 may be utilized to detect one or more road users 104 located within the surrounding environment of the vehicle 102. The road user detection application 106 may additionally be configured to analyze a receive signal strength (RSSI) value of reflected vehicle communication signals that are received by the vehicle 102 via the 5G communication band based on the sending of vehicle communication signals from the vehicle 102 to the one or more respective road users 104. As discussed, the road user detection application 106 may analyze received signal strength of each of the plurality of reflected vehicle communication signals received by the vehicle 102 in the form of RSSI values and may determine attributes associated with one or more respective road user(s) 104 detected within the surrounding environment of the vehicle 102.

With particular reference to the vehicle 102, the vehicle 102 may include a vehicle computing device 108 (VCD) with provisions for processing, communicating and interacting with various components of the vehicle 102 and other components of the environment 100. In one embodiment, the VCD 108 may be implemented on an electronic control unit (not shown), among other components of the vehicle 102. Generally, the VCD 108 includes a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCD 108 and other components, networks, and data sources, of the environment 100.

The VCD 108 may also be operably connected for computer communication (e.g., via the bus and/or the I/O interface) to a head unit 110. The head unit 110 may include internal processing memory, an interface circuit, and bus lines (components of the head unit 110 not shown) for transferring data, sending commands, and communicating with the components of the vehicle 102 directly and/or through the VCD 108. In one or more embodiments, the head unit 110 may execute one or more operating systems, applications, and/or interfaces that are associated with the vehicle 102.

In some embodiments, the head unit 110 may be connected to one or more respective display devices (not shown) (e.g., display screens), respective audio devices (not shown) (e.g., audio system, speakers), respective haptic devices (not shown) (e.g., haptic steering wheel), etc. that that may be operably controlled to provide a human machine interface (HMI) (not shown) to provide a driver of the vehicle 102 with various types of information that may include, but not limited to, alerts and/or interfaces associated with vehicle safety systems (not shown) that may be provided with respect to the one or more road users 104 located within the surrounding environment of the vehicle 102.

In one or more embodiments, the head unit 110 may be operably connected to a storage unit 112. The storage unit 112 may store one or more operating systems, applications, associated operating system data, application data, vehicle system and subsystem user interface data, and the like that are executed by the VCD 108 and/or the head unit 110. For example, the storage unit 112 may be utilized to store application data associated with the road user detection application 106. As discussed below, such data may include, but may not be limited to, RSSI values that provided by the application 106 and are associated with each of the reflected vehicle communication signals received by the vehicle 102.

In an exemplary embodiment, the vehicle 102 may additionally include vehicle sensors 114 that may sense and provide sensor data that is utilized by the vehicle 102, vehicle systems 116 of the vehicle 102 and/or the application 106. In one embodiment, the vehicle sensors 114 may include radar sensors (not shown) that may be utilized to sense one or more objects including the road user(s) 104 located within the surrounding environment of the vehicle 102. In particular, the radar sensors may provide sensor data that may be evaluated by one or more components of the vehicle 102, additional sensors of the vehicle sensors 114, and/or the vehicle systems 116 to determine attributes related to road user(s) 104 sensed by the radar sensors. As discussed below, the sensor data provided by the radar sensors and/or additional vehicle sensors may be supplemented by the attributes associated with the road user(s) 104 that are determined based on evaluation of reflected vehicle communication signals received by the vehicle 102.

In some embodiments, the vehicle sensors 114 may additionally include LADAR sensors, LiDAR sensors, laser sensors, image sensors, light sensors, proximity sensors, and the like that may be utilized to provide sensor data to the VCD 108 of the vehicle 102 and/or the vehicle systems 116 of the vehicle 102. In one or more embodiments, the vehicle sensors 114 may include GPS sensors. The GPS sensors may be utilized to provide a geo-location (e.g., GPS coordinates, DGPS coordinates) of the vehicle 102 and/or objects that are located within the surrounding environment of the vehicle 102. In particular, the sensor data from the GPS sensors may provide navigational coordinates that may be associated with sensor data to provide geo-coordinates of one or more road user 104, as sensed by the vehicle sensors 114. For example, upon sensing the road user(s) 104 located within the surrounding environment of the vehicle 102, the sensor data may be analyzed to determine the geo-location coordinates associated with one or more road users 104 sensed by the radar, LiDAR, LADAR, or image sensors of the vehicle sensors 114.

In some configurations, the sensor data provided by the radar sensors may be aggregated with sensor data that is provided by the additional vehicle sensors to provide attributes associated with the road user(s) 104 sensed within the surrounding environment of the vehicle 102. Such attributes may include, but may not be limited to, locational attributes, directional attributes, and/or dynamic attributes that are associated with the road user(s) 104. The attributes may be provided as values that may be relative to the operation of the vehicle 102. In other words, the attributes may provide information as to the location, directions, and dynamics of the road user(s) 104 relative to the vehicle 102.

The vehicle systems 116 of the vehicle 102 may include, but may not be limited to, any automatic or manual systems that may be used to enhance the vehicle, driving, and/or safety. Exemplary vehicle systems may include vehicle safety systems that may include, but are not limited to an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, and a passenger detection system. The vehicle systems 116 may additionally include vehicle operation systems (not shown) that may include, but may not be limited to, a navigation system, a transmission system, brake pedal systems, an electronic power steering system, visual devices (e.g., camera systems, proximity sensor systems), a climate control system, an electronic pretensioning system, a monitoring system, a vehicle suspension system, a vehicle seat configuration system, a vehicle cabin lighting system, an audio system, a sensory system, an interior or exterior camera system among others.

In one embodiment, the vehicle systems 116 may provide vehicle system data to provide context to the sensor data provided by the vehicle sensors 114. In additional embodiments, the vehicle systems 116 may utilize the sensor data provided by the vehicle sensors 114 and/or the attributes of the road user(s) 104 as provided by the application 106 to provide safety measures within the vehicle 102 that may include, alerts, warnings, interfaces, autonomous driving maneuvers, etc.

More specifically, the sensor data provided to the vehicle systems 116 may be enhanced based on attributes determined by the application 106 to supplement any lapses in sensor data that may be the result of potential sensor interference based on a large number of radar equipped road user(s) 104 within the surrounding environment of the vehicle 102. For example, the application 106 may provide the determined attributes associated with the road user(s) 104 to supplement the sensor data provided by the vehicle sensors such as the radar sensors to ensure that such interference has no effect on the operation of the vehicle 102, the components of the vehicle 102 including the vehicle systems 116.

In an exemplary embodiment, the vehicle 102 may additionally include a vehicle communication system 118. The vehicle communication system 118 may be capable of channeling vehicle communications that are sent and received through one or more 5G enabled vehicle communications transceiver(s) (5G transceiver) 120 that are operably connected to the vehicle communication system 118. The vehicle communication system 118 may additionally be capable of providing wired or wireless computer communications utilizing various protocols to send/receive non-transitory signals internally to the plurality of components of the vehicle 102 and/or one or more external devices. Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system.

In an exemplary embodiment, the 5G transceiver(s) 120 operably connected to the vehicle communication system 118 may be capable of communication through one or more vehicle communications protocols on the vehicle communications network. More particularly, the 5G transceiver(s) 120 may be capable of implementing V2V, V2I, and V2X communications through the vehicle communications network by providing 5G vehicle communications signals (e.g., V2V communication signals, V2I communication signals, V2X communication signals) that may be communicated to the road user(s) 104, infrastructure (e.g., road side equipment on traffic lights, street lights) located within the surrounding environment of the vehicle 102 (not shown), and/or devices (portable devices worn by pedestrian) located within the surrounding environment of the vehicle 102 (not shown).

In one embodiment, the 5G transceiver(s) 120 may be configured to send and receive signals in a full-duplex manner. In particular, 5G transceiver(s) 120 may be configured to simultaneously send and receive vehicle communications signals on the vehicle communications network. In particular, the 5G transceiver(s) 120 may send and/or receive vehicle communications messages with the road user(s) 104. The vehicle communication system 118 may utilize the 5G transceiver(s) 120 to send and receive the vehicle communication messages that may include vehicle data that is communicated by the vehicle 102 to the road user(s) 104 and/or vehicle data that is received by the vehicle 102 from the road user(s) 104. Such vehicle data may include sensor data, vehicle system data, and additional data that may be provided by the vehicle 102 and/or the road user(s) 104 to be evaluated by the VCD 108 of the vehicle 102 and/or a vehicle computing device (VCD) 124 of the road user(s) 104 to provide various functions.

In an exemplary embodiment, the 5G transceiver(s) 120 may be configured to provide a radar-like capability by sending (e.g., transmitting) vehicle communications signals in the form of respective beams (e.g., at 50 Hz) that may be sent to the road user(s) 104 detected by the application 106 as being located with the surrounding environment of the vehicle 102. The 5G transceiver(s) 120 may also be configured to provide the radar-like capability by receiving reflected vehicle communication signals (e.g., the beams) that are reflected back to the 5G transceiver(s) 120.

In particular, upon sending the vehicle communication signals as respective beams, the signals may be received by the vehicle communication system 130 of the road user(s) 104. Additionally, the vehicle communication signals may be reflected off of the body (e.g., vehicle body, bumper, hood, panels) of the road user(s) 104 and may be received as the reflected vehicle communication signals by the 5G transceiver(s) 120. As discussed below, the vehicle communication system 118 may provide information associated with the received vehicle communication signals that may be analyzed by the road user detection application 106 to determine the RSSI values of each of the received communication signals. This functionality may be utilized to provide the radar-like capability of the 5G transceiver(s) 120 and allow the vehicle communication signals that are sent by the 5G transceiver(s) 120 to be dual purposed to not only provide vehicle data to the road user(s) 104, but to also be utilized to determined attributes associated with the road user(s) 104 based on the RSSI values of the reflected vehicle communication signals reflected off of the road user(s) 104.

In an exemplary embodiment, the 5G transceiver(s) 120 may be attached to and/or included as part of respective directional antenna(s) 122. The directional antenna(s) 122 may be disposed at an external front and/or side portions of the vehicle 102, including, but not limited to different portions of the vehicle bumper, vehicle lighting units, vehicle fenders, vehicle mirrors, vehicle ceiling, and a windshield (vehicle portions not shown). The directional antenna(s) 122 may be configured to oscillate and/or be moved from one location to another (e.g., right portion of bumper to left portion of bumper).

In particular, the directional antenna(s) 122 may be configured to oscillate and/or be moved to allow the 5G transceiver(s) 120 to send the vehicle communication signal(s) as a beam(s) that sweep the surrounding environment of the vehicle 102 to send the beam(s) specifically towards the road users(s) 104 as detected by the application 106 in order to be reflected back from the road user(s) 104 to the vehicle 102 and received by the 5G transceiver(s) 120. In other words, the directional antenna(s) 122 may be configured to oscillate and/or be moved to allow the 5G transceiver(s) 120 to send vehicle communications signal beams directly to the one or more road users 104 detected as being located within the surrounding environment of the vehicle 102 and to receive the reflections of the vehicle communication signal beams as reflected vehicle communication signals. As discussed below, the application 106 may communicate with the vehicle communication system 118 to position the directional antenna(s) 122 to be oscillated and/or moved in one or more positions to enable the 5G transceiver(s) 120 to directly send the vehicle communication signals to the road user(s) 104 that are detected by the application 106.

With particular reference to the road user(s) 104, the road user(s) 104 may include, but may not be limited to, a passenger car, a truck, a bus, a motor cycle, and the like. The VCD 124 of the road user(s) 104 may include provisions for processing, communicating and interacting with various components of road user(s) 104 and other components of the environment 100. In one embodiment, the VCD 124 may be implemented on an electronic control unit (not shown), among other components of the road user(s) 104. Generally, the VCD 124 includes a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCD 124 and other components, networks, and data sources, of the environment 100.

In an exemplary embodiment, the VCD 124 may be operably connected to a storage unit 128 that may be included as a stand-alone component of the road user(s) 104. In one embodiment, the storage unit 128 may include provide data associated with the road user(s) 104 that may include road user categorization information and sensor data that is stored by vehicle sensors 126 of the road user(s) 104 to be communicated to the vehicle 102 and/or other road users (not shown) located within a vicinity of the road user(s) 104.

In one or more embodiments, the vehicle sensors 126 may include, but may not be limited to, vehicle dynamics sensors, vehicle imaging sensors, vehicle seat sensors, vehicle door sensors, and the like. In particular, the vehicle dynamics sensors may provide vehicle dynamics information associated with the road user(s) 104 in the form of the sensor data that may be stored on the storage unit 128. The vehicle sensors 126 may additionally provide one or more attributes relating to the road user(s) 104 that may be stored in the form of the sensor data on the storage unit 128. As discussed below, the sensor data may be communicated to the vehicle 102 and/or additional road user through vehicle communication signals on the vehicle communications network.

The vehicle communication system 130 of the road user(s) 104 may be configured to communicate using one or more vehicle communications protocols through the vehicle communications network to the vehicle 102 and/or additional road users. The vehicle communication system 130 may additionally be capable of providing wired or wireless computer communications utilizing various protocols to send/receive non-transitory signals internally to the plurality of components of the road user(s) 104 and/or externally to external devices including the vehicle 102 and one or more additional road users. Generally, these protocols include a wireless system (e.g., IEEE 802.11 (Wi-Fi_33), IEEE 802.15.1 (Bluetooth®)), a near field communication system (NFC) (e.g., ISO 13157), a local area network (LAN), and/or a point-to-point system.

In an exemplary embodiment, the vehicle communication system 130 may communicate through the vehicle communications network with the vehicle communication system 118 of the vehicle 102 to communicate the vehicle communication messages through vehicle communication signals (e.g., V2V communication signals). The vehicle communication messages may include the aforementioned profile data and/or the sensor data stored on the storage unit 128 of the road user(s) 104. As discussed below, the application 106 may detect the road user(s) 104 as being located within the surrounding environment of the vehicle 102 based on the receipt and analysis of the vehicle communications that are sent from the vehicle communication system 130 and received by the 5G transceiver(s) 120 operably connected to the vehicle communication system 118. In other words, the application 106 may evaluate the profile data and/or the sensor data to detect the existence of the road user(s) 104 within the surrounding environment of the vehicle 102.

II. Road User Detection Application

In an exemplary embodiment, the road user detection application 106 may be stored on the storage unit 112 and may be executed by the VCD 108 and/or the head unit 110 of the vehicle 102. In an additional embodiment, the road user detection application 106 may be partially or fully stored and executed on an externally hosted server infrastructure (not shown) that may be accessed by the vehicle communication system 118 through an internet cloud (not shown). As discussed in detail below, the road user detection application 106 may be utilized to detect road user(s) 104 that is located within the surrounding environment of the vehicle 102. The detection of the road user(s) 104 may be conducted based on vehicle communication signals sent by the road user(s) 104 and received by the vehicle 102 and/or sensor data provided by the vehicle sensors 114 of the vehicle 102. Upon detecting the road user(s) 104, the application 106 may communicate with the vehicle communication system 118 of the vehicle 102 to send vehicle communication signals to towards the detected road user(s) 104.

The application 106 may additionally analyze the reflected vehicle communication signals that are reflected off the body of the road user(s) 104 and may be received as the reflected vehicle communication signals by the 5G transceiver(s) 120 of the vehicle 102. As discussed below, based on this analysis, the application 106 may determine an RSSI value of each of the reflected vehicle communication signals to determine attributes associated with the road user(s) 104 detected to be located within the surrounding environment of the vehicle 102.

In an exemplary embodiment, the road user detection application 106 may include a road user detection module 132, a signal strength determinant module 134, and an attribute determinant module 136. It is to be appreciated that the road user detection application 106 may include additional modules and/or sub-modules that are configured to execute one or more functions of the application 106.

In one or more embodiments, the road user detection module 132 may be utilized to detect the existence of one or more of the road user(s) 104 that are located within the surrounding environment of the vehicle 102. In one embodiment, the road user detection module 132 may communicate with the vehicle communication system 118 of the vehicle 102 to receive data associated with one or more vehicle communications messages received in the form of vehicle communication signals by the 5G transceiver 120. As discussed above, the vehicle communications messages may include profile data and sensor data that is communicated to the vehicle 102 through one or more vehicle communication signals (e.g., V2V communication signals) sent via the vehicle communication system 130 of the road user(s) 104.

Upon receiving data associated with the vehicle communication message(s), the road user detection module 132 may analyze the data to detect the road user(s) 104 as being located within the surrounding environment of the vehicle 102. As discussed below, the road user detection module 132 may additionally analyze the sensor data included within the message(s) to obtain a geo-location(s) (e.g., GPS location, DGPS location) of the road user(s) 104 relative to the vehicle 102 and may determine a geo-tag(s) associated with the road user(s) 104 to specifically identify (e.g., tag an identity to) each road user(s) 104 detected as being located within the surrounding environment of the vehicle 102.

In another embodiment, the road user detection module 132 may alternatively or additionally evaluate sensor data that is provided by the vehicle sensors 114 of the vehicle 102 to detect the road user(s) 104 located within the surrounding environment of the vehicle 102. The road user detection module 132 may analyze the sensor data to determine the geo-locations(s) of the road user(s) 104 based on a geo-location of the vehicle 102 and an estimated distance between the vehicle 102 and the road user(s) 104 based on the sensor data that is determined by the road user detection module 132. In one embodiment, upon detecting the road user(s) 104, the road user detection module 132 may communicate the respective geo-tag(s) associated with the detected road user(s) 104 to the signal strength determinant module 134.

In an exemplary embodiment, upon receiving the respective geo-tag(s) associated with the detected road user(s) 104 from the road user detection module 132, the signal strength determinant module 134 may evaluate the geo-tag(s) to determine a relative location of the road user(s) 104 within the surrounding environment of the vehicle 102 as compared to the vehicle 102. In one embodiment, the signal strength determinant module 134 may communicate with the vehicle communication system 118 to operably control the oscillation/movement of the directional antenna(s) 122 towards the detected road user(s) 104. Upon the oscillation/movement of the directional antenna(s) 122, the signal strength determinant module 134 may communicate with the vehicle communication system 118 to operably control the 5G transceiver(s) 120 to send (e.g., transmit) a plurality of vehicle communication messages in the form of respective beams that may be sent to the road user(s) 104 as detected by the road user detection module 132.

As discussed above, the vehicle communication system 130 of the road user(s) 104 may receive the vehicle communication messages that may include vehicle data associated with the vehicle 102. Such vehicle data may include sensor data, vehicle system data, and additional data that may be provided by the vehicle 102 and/or the road user(s) 104 to be evaluated by the VCD 108 of the vehicle 102 and/or a vehicle computing device (VCD) 124 of the road user(s) 104 to provide various functions to the road user(s) 104. Additionally, the vehicle communication signals may be reflected off of the body of the road user(s) 104 and may be received as the reflected vehicle communication signals by the 5G transceiver(s) 120.

In one embodiment, the signal strength determinant module 134 may be configured to determine the RSSI values of each of the reflected vehicle communication signals received by the 5G transceiver(s) 120. In particular, the signal strength determinant module 134 may evaluate the respective signal strengths of the vehicle communication messages sent in the form of respective beams by the 5G transceiver 120 and may use the respective signal strengths as a baseline that may be utilized to calculate the signal strengths in the form of the RSSI values of each of the reflected vehicle communication signals.

Upon determining each of the RSSI values, the signal strength determinant module 134 may store the RSSI values associated with each of the reflected vehicle communication signals received from each of the one or more road user(s) 104 on the storage unit 112 of the vehicle 102. In some embodiments, each of the RSSI values may be stored with the associated geo-tag of each of the one or more road users 104 that are detected as being located within the surrounding environment of the vehicle 102. In additional embodiments, the signal strength determinant module 134 may directly communicate each of the RSSI values to the attribute determinant module 136 of the road user detection application 106.

In an exemplary embodiment, the attribute determinant module 136 may retrieve the RSSI values from the storage unit 112 or receive the RSSI values that are directly communicated by the signal strength determinant module 134. Upon retrieving/receiving the RSSI values, the attribute determinant module 136 may analyze the signal strengths of the vehicle communication signals. In particular, as discussed in more detail below, the attribute determinant module 136 may analyze the RSSI values individually to determine attributes associated with the road user(s) 104 that include, but may not be limited to, a relative location, relative direction, and relative dynamics of the road user(s) 104 located within the surrounding environment of the vehicle 102 with respect to the vehicle 102. In some embodiments, the attribute determinant module 136 may evaluate RSSI values in comparison to one another to track the road user(s) 104 and to provide the relative locations, relative directions, and relative dynamics to track the attributes of the road user(s) 104 over a period of time relative to the vehicle 102.

As discussed above, the attributes associated with the road user(s) 104 may be provided by the attribute determinant module 136 to supplement sensor data such as radar data during one or more circumstances, including when radar interference affects radar data being received by the vehicle 102. Additionally, this functionality may ensure that the vehicle 102 may receive attributes associated with the road user(s) 104 that may be utilized by vehicle systems 116 of the vehicle 102 to provide one or more functions (e.g., safety functions) within the vehicle 102. In other words, the application 106 dual purposes the vehicle communication messages sent by the vehicle 102 to the road user(s) 104 to not only provide vehicle data to the road user(s) 104 but to also supplement the sensor data provided by the vehicle sensors 114 by utilizing the signal strength of the reflected vehicle communication signals to determine the attributes associated with the road user(s) 104 detected within the surrounding location of the vehicle 102.

III. Methods Related to the Road User Detection Application

Figure 2:
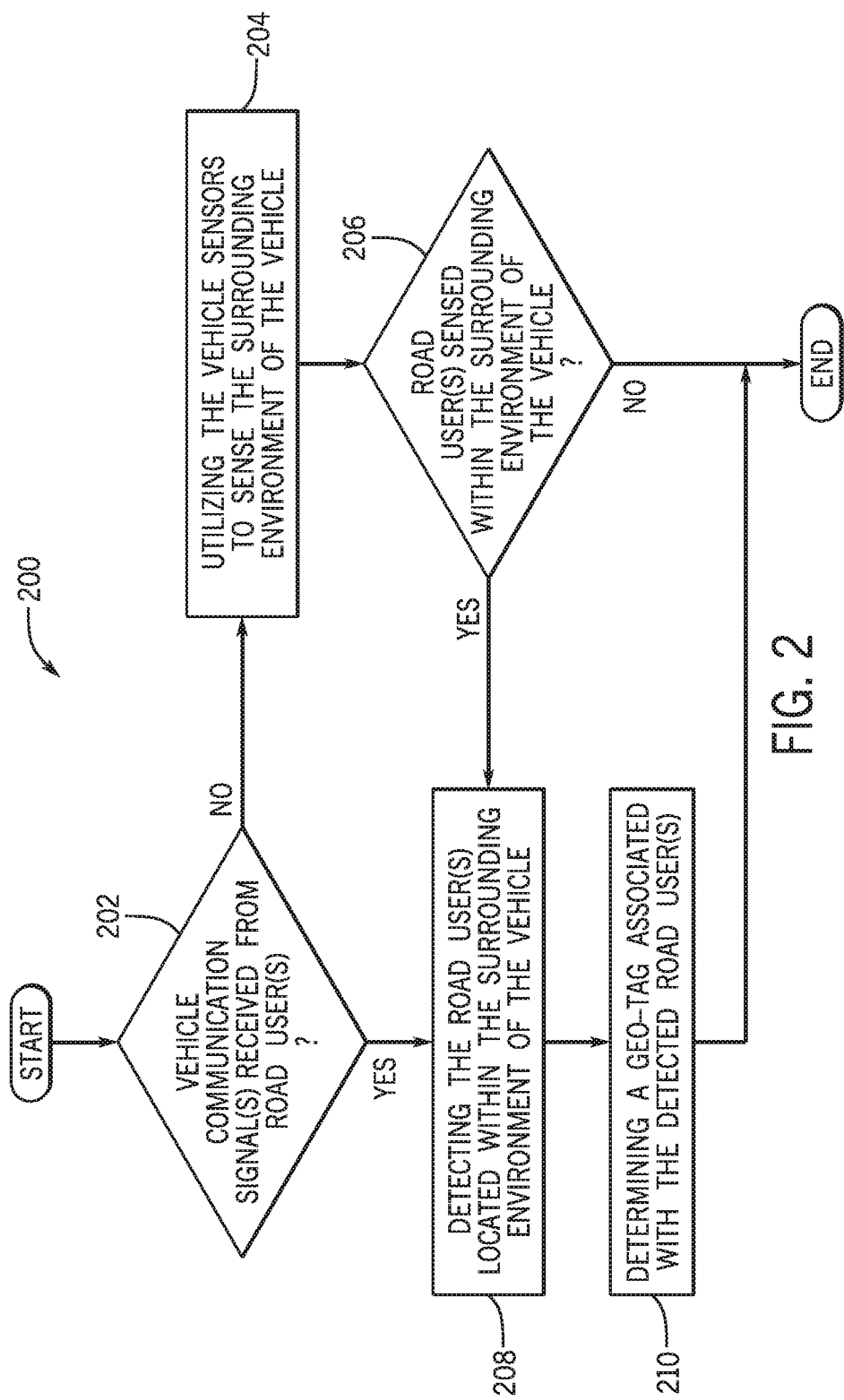
FIG. 2 is a process flow diagram of a method for detecting one or more road users that are located within the surrounding environment of a vehicle according to an exemplary embodiment.

FIG. 2 is a process flow diagram of a method 200 for detecting one or more road users that are located within the surrounding environment of the vehicle 102 according to an exemplary embodiment. FIG. 2 will be described with reference to the components of FIG. 1 though it is to be appreciated that the method 200 of FIG. 2 may be used with other system and/or components. The method 200 may begin at block 202, wherein the method 200 may include determining if a vehicle communication signals(s) has been received from the road user(s) 104. As discussed above, the vehicle communication system 130 of the road user(s) 104 may be utilized to send one or more vehicle communication signal(s) (e.g., V2V communication signals) that contain one or more vehicle communication messages. The vehicle communication message(s) may include profile data and sensor data that are retrieved from the storage unit 128 of the road user(s) 104 and communicated within the vehicle communication message(s) to provide road user related data to the vehicle 102. In some embodiments, the sensor data within the vehicle communication message(s) may include geo-locations of the road user(s) 104 and geo-location(s) of additional road user(s) 104 (e.g., that may not be capable of communicating via the vehicle communications protocol) that are sensed by the vehicle sensors 126 of the road user(s) 104.

In one embodiment, upon the 5G transceiver 120 receiving the vehicle communication signal(s) sent by the road user(s) 104, the vehicle communication system 118 may communicate data associated with the vehicle communication message(s) to the road user detection module 132 to be analyzed. Additionally, the vehicle communication system 118 may communicate data associated with the vehicle communication message(s) to the VCD 108 of the vehicle 102 to be used by one or more components of the vehicle 102. If the road user detection module 132 receives the data associated with the vehicle communication signal(s) within a predetermined period of time (e.g., every 10 seconds), the road user detection module 132 determines that the vehicle communication(s) have been received from the road user(s) 104. Alternatively, if the road user detection module 132 does not receive the data associated with the vehicle communication message(s) within the predetermined period of time, the road user detection module 132 determines that the vehicle communication signal(s) have not been received from the road user(s) 104. This may indicate that one or more road users that have the capability to communicate using the vehicle communications protocols (e.g., by sending vehicle communication signals) may not be located within the surrounding environment of the vehicle 102.

If it is determined that the vehicle communications signal(s) have not been received from the road user(s) 104 (at block 202), the method 200 may proceed to block 204, wherein the method 200 may include utilizing the vehicle sensors 114 to sense the surrounding environment of the vehicle 102. In an exemplary embodiment, the road user detection module 132 may communicate with the VCD 108 to actuate the vehicle sensors 114 to sense the surrounding environment of the vehicle 102 to sense the existence of one or more road users 104 that may be located within the surrounding environment of the vehicle 102. This functionality may ensure that certain road users 104 (e.g., legacy model vehicles) that may not be capable of communicating with the vehicle 102 directly via the vehicle communications network may be detected as being located within the surrounding environment of the vehicle 102.

The method 200 may proceed to block 206, wherein the method 200 may include determining if the road user(s) 104 is sensed within the surrounding environment of the vehicle 102. In an exemplary embodiment, upon utilizing the vehicle sensors 114 of the vehicle 102 to sense the surrounding environment of the vehicle 102, the vehicle sensors 114 may communicate sensor data to the VCD 108. The VCD 108 may thereby provide the sensor data to the road user detection module 132. The road user detection module 132 may analyze the sensor data to determine if the road user(s) 104 is sensed within the surrounding environment of the vehicle 102.

If its determined that the vehicle communication signal(s) is received from the road user(s) 104 (at block 202) or the road user(s) is sensed within the surrounding environment of the vehicle (at block 206), the method 200 may proceed to block 208, wherein the method 200 may include detecting the road user(s) 104 located within the surrounding environment of the vehicle 102. In an exemplary embodiment, upon receiving the vehicle communication signal(s) from the road user 104 and/or determining that the road user(s) 104 is sensed within the surrounding environment of the vehicle 102, the road user detection module 132 may detect one or more road user(s) 104 as being located within the surrounding environment of the vehicle 102.

The method 200 may proceed to block 210, wherein the method 200 may include determining a geo-tag associated with the detected road user(s) 104. In one embodiment, upon detecting the road user(s) 104, the road user detection module 132 may determine a respective geo-tag(s) associated with the detected road user(s) 104. In one embodiment, the road user detection module 132 may analyze sensor data included within data associated with the vehicle communication message(s) received from the road user(s) 104 (as discussed with respect to block 202). In particular, the road user detection module 132 may analyze the sensor data provided by the vehicle sensors 126 to obtain a geo-location(s) of the road user(s) 104 itself and one or more additional road users sensed by the vehicle sensors 126 relative to the vehicle 102. The road user detection module 132 may consequently determine a geo-tag(s) associated with the road user(s) 104 detected as being located within the surrounding environment of the vehicle 102.

In another embodiment, the road user detection module 132 may evaluate sensor data that is provided by the vehicle sensors 114 of the vehicle 102 to detect the road user(s) 104 located within the surrounding environment of the vehicle 102 (as discussed with respect to blocks 204 and 206). The road user detection module 132 may analyze the sensor data to determine the geo-locations(s) of the road user(s) 104 based on a geo-location of the vehicle 102 and an estimated distance between the vehicle 102 and the road user(s) 104 based on the sensor data that is determined by the road user detection module 132.

In particular, the road user detection module 132 may evaluate the geo-location of the vehicle 102 and may utilize radar data, LADAR data, LiDAR data, and/or image data to determine a relative distance of the road user(s) 104 from the vehicle 102. The road user detection module 132 may be configured to utilize the sensed geo-location of the vehicle 102 and the relative distance of the road user(s) 104 to determine the geo-tag(s) associated with the road user(s) 104. In one embodiment, upon detecting the road user(s) 104, the road user detection module 132 may communicate the respective geo-tag(s) associated with the detected road user(s) 104 to the signal strength determinant module 134.

Figure 3:
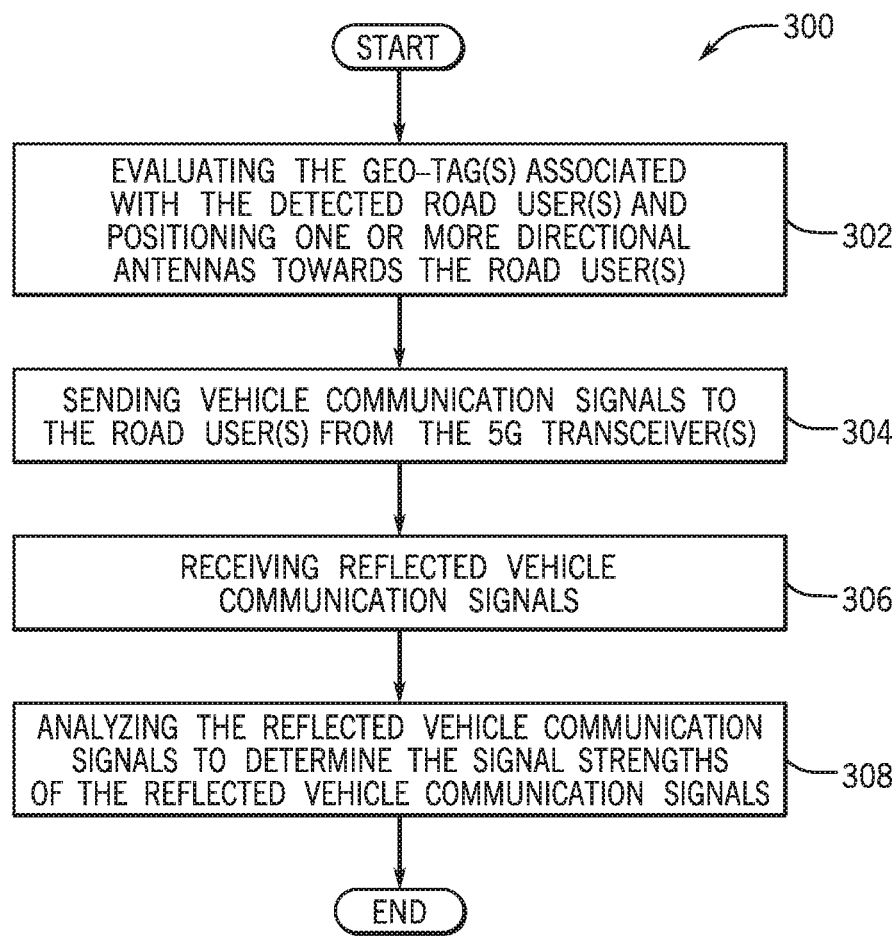
FIG. 3 is a process flow diagram of a method for analyzing reflected vehicle communication signals to determine a received signal strength of each of reflected vehicle communication signals according to an exemplary embodiment.

FIG. 3 is a process flow diagram of a method 300 for analyzing reflected vehicle communication signals to determine a received signal strength of each of the reflected vehicle communication signals according to an exemplary embodiment. FIG. 3 will be described with reference to the components of FIG. 1 though it is to be appreciated that the method 300 of FIG. 3 may be used with other system and/or components. The method 300 may begin at block 302, wherein the method 300 may include evaluating the geo-tag(s) associated with the detected road user(s) 104 and positioning one or more directional antennas 122 towards the road user(s) 104.

In an exemplary embodiment, upon receiving the respective geo-tag(s) associated with the detected road user(s) 104 from the road user detection module 132, the signal strength determinant module 134 may evaluate the respective geo-tags to determine a relative direction of the road user(s) 104 within the surrounding environment of the vehicle 102 as compared to the vehicle 102. Upon determining the relative direction of the road user(s) 104, the signal strength determinant module 134 may communicate with the vehicle communication system 118 to operably control the oscillation/movement of one or more of the directional antenna(s) 122 towards the detected road user(s) 104 to ensure that vehicle communication signals sent by the 5G transceiver 120 are sent in the form of respective beams in the specific direction of the road user(s) 104.

The method 300 may proceed to block 304, wherein the method 300 may include sending vehicle communication signals to the road user(s) 104 from the 5G transceiver(s) 120. Upon the oscillation/movement of the directional antenna(s) 122, the signal strength determinant module 134 may communicate with the vehicle communication system 118 to operably control the 5G transceiver(s) 120 to send (e.g., transmit) a plurality of vehicle communication messages in the form of respective beams that may be sent to the road user(s) 104 as detected by the road user detection module 132. In particular, the vehicle communication system 118 may utilize the 5G transceiver(s) 120 to send the vehicle communication messages in the form of the respective beams that are propagated directly towards the road user(s) 104. The vehicle communication system 130 of the road user(s) 104 may receive the vehicle communication messages that may include vehicle data associated with the vehicle 102. Such vehicle data may include sensor data, vehicle system data, and additional data that may be provided by the vehicle 102 to be evaluated by the VCD 124 of the road user(s) 104 to provide various functions to the road user(s) 104.

The method 300 may proceed to block 306, wherein the method 300 may include receiving reflected vehicle communication signals. In an exemplary embodiment, upon sending the vehicle communication signals in the form of respective beams, the signals may be received by the road user(s) 104 and the respective beams may also be reflected off of the body of the road user(s) 104 back towards the vehicle 102. The signal strength determinant module 134 may communicate with the vehicle communication system 118 to ensure that the directional antenna(s) 122 is (still) positioned towards the road user(s) 104 to ensure the reflected vehicle communication signals may be received by the 5G transceiver(s) 120. Consequently, upon sending the vehicle communication signals to the road user(s) 104, the 5G transceiver(s) 120 is positioned to receive the reflected vehicle communication signals reflected off of the body of the road user(s) 104.

The method 300 may proceed to block 308, wherein the method 300 may include analyzing the reflected vehicle communication signals to determine the signal strengths of the reflected vehicle communication signals. As discussed above, the signal strength determinant module 134 may be configured to determine the RSSI values of each of the reflected vehicle communication signals received by the 5G transceiver(s) 120. In particular, the signal strength determinant module 134 may evaluate the respective signal strengths of the vehicle communication messages sent in the form of respective beams by the 5G transceiver(s) 120 and may use the respective signal strengths as a baseline that may be utilized to calculate the signal strengths of the reflected vehicle communication signals. Based on the calculation of the signal strengths, the signal strength determinant module 134 may output respective RSSI values of the each of the reflected vehicle communication signals. In one embodiment, the signal strength determinant module 134 may associate geo-tag(s) of each of the one or more road users 104 that are detected as being located within the surrounding environment of the vehicle 102 with the RSSI values and may store the RSSI values on the storage unit 112 and/or directly communicate each of the RSSI values to the attribute determinant module 136 of the road user detection application 106.

Figure 4:
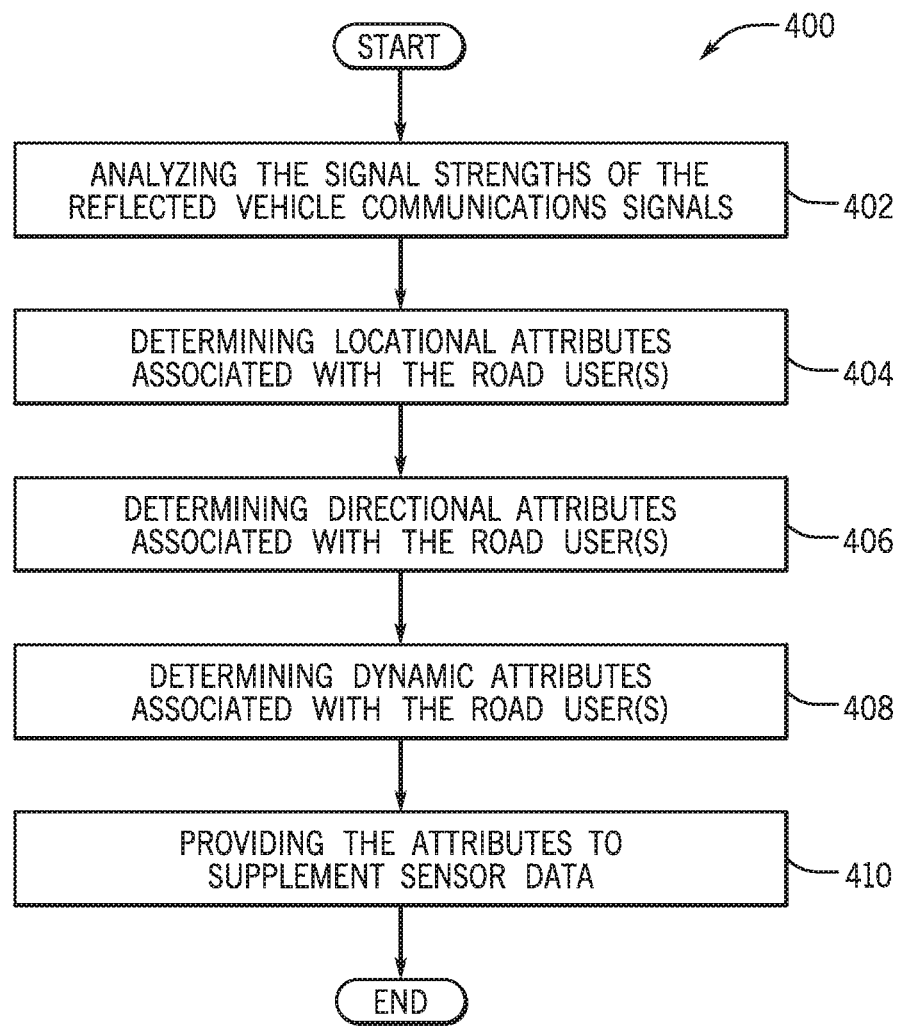
FIG. 4 is a process flow diagram of a method for analyzing received signal strengths of each of the reflected vehicle communication signals according to an exemplary embodiment.

FIG. 4 is a process flow diagram of a method 400 for analyzing received signal strengths of each of the reflected vehicle communication signals according to an exemplary embodiment. FIG. 4 will be described with reference to the components of FIG. 1 though it is to be appreciated that the method 400 of FIG. 4 may be used with other system and/or components. The method 400 may begin at block 402, wherein the method 400 may include analyzing the signal strengths of the reflected vehicle communication signals.

In an exemplary embodiment, upon receiving the RSSI values from the signal strength determinant module 134, the attribute determine module 136 may analyze the RSSI values of each of the respective reflected vehicle communication signals received by the 5G transceiver(s) 120. In particular, the RSSI values may be analyzed to determine data that pertains to attributes associated with the road user(s) 104 that are relative to the vehicle 102. In other words, the attribute determine module 136 may determine data that includes the attributes of the road user(s) 104 within the surrounding environment of the vehicle 102 that pertain to the position of the vehicle 102, the direction of travel of the vehicle 102, and/or a travel path of the vehicle 102 that are based on analysis of the received signal strengths of the reflected vehicle communication signals.

In an exemplary embodiment, the analysis of RSSI values may include the comparison of the RSSI values against predetermined RSSI thresholds (e.g., road user locational range RSSI values that pertain to certain distance ranges between the road user(s) 104 and the vehicle 102, road user directional RSSI values that pertain to certain directions of the road user(s) 104 relative to the vehicle 102, road user velocity RSSI values that pertain to certain velocities of the road user(s) 104 relative to the vehicle 102) that may be utilized to determine several types of attributes of the road user(s) 104. Such predetermined RSSI thresholds may pertain to locational attributes, directional attributes, and dynamic attributes associated with the road user(s) 104. For example, RSSI values of each of the reflected vehicle communication signals may be compared against the predetermined RSSI thresholds and/or compared to one another to determine the relative location, direction, and/or dynamics of the road user(s) 104 relative to the vehicle 102.

The method 400 may proceed to block 404, wherein the method 400 may include determining locational attributes associated with the road user(s) 104. In one embodiment, upon analyzing the RSSI values of each of the respective reflected vehicle communication signals and determining data that includes the attributes that pertain to the vehicle 102, the attribute determinant module 136 may analyze the data and determine location attributes associated with the road user(s) 104. The location attributes associated with the road user(s) 104 may include a relative location(s) of the road user(s) 104 with respect to the vehicle 102. In particular, the relative location(s) may include the respective position, location, and range (from the vehicle 102) of each of the one or more road user(s) 104 as detected within the surrounding environment of the vehicle 102. In one embodiment, the attribute determinant module 136 may compare RSSI values of each of the reflected vehicle communication signals to track the position, location, and range of the road user(s) for a period of time that the respective road user(s) 104 is detected within the surrounding environment of the vehicle 102

The method 400 may proceed to block 406, wherein the method 400 may include determining directional attributes associated with the road user(s) 104. In one embodiment, upon determining data that includes the attributes that pertain to the vehicle 102, the attribute determinant module 136 may analyze the data and determine directional attributes associated with the road user(s) 104. The directional attributes associated with the road user(s) 104 may include the relative direction(s) of the road user(s) 104 with respect to the vehicle 102. In particular, the relative direction(s) may include the respective traveling direction, heading, and/or trajectory of the road user(s) 104 as detected within the surrounding environment of the vehicle 102. In one embodiment, the attribute determinant module 136 may compare RSSI values of each of the reflected vehicle communication signals to track the traveling direction, heading, and/or trajectory of the road user(s) for a period of time that the respective road user(s) 104 is detected within the surrounding environment of the vehicle 102.

The method 400 may proceed to block 408, wherein the method 400 may include determining dynamic attributes associated with the road user(s) 104. In one embodiment, upon determining data that includes the attributes that pertain to the vehicle 102, the attribute determinant module 136 may analyze the data and determine dynamic attributes associated with the road user(s) 104. The dynamic attributes associated with the road user(s) 104 may include the relative dynamics of the road user(s) 104 with respect to the vehicle 102. In particular, the relative dynamics of the road user(s) 104 may include the respective velocity, acceleration, and deceleration (e.g., braking) of the road user(s) 104 as detected within the surrounding environment of the vehicle 102. In one embodiment, the attribute determinant module 136 may compare RSSI values of each of the reflected vehicle communication signals to track the velocity, acceleration, and deceleration of the road user(s) 104 for a period of time that the respective road user(s) 104 is detected within the surrounding environment of the vehicle 102.

The method 400 may proceed to block 410, wherein the method 400 may include providing the attributes to supplement the sensor data. In an exemplary embodiment, upon determining the location attributes, the directional attributes, and the dynamic attributes of the road user(s) 104 based on the RSSI values of the reflected vehicle communication signals, the attribute determinant module 136 may communicate the aforementioned attributes to the VCD 108 of the vehicle 102 to supplement sensor data. The VCD 108 may communicate the aforementioned attributes to one or more components of the vehicle 102 including the vehicle systems 116. Therefore, the sensor data such as radar data may be supplemented during one or more circumstances, as determined by the VCD 108, including, but not limited to, if radar interference affects radar data being received by the vehicle 102.

As discussed above, in one embodiment, the attribute determinant module 136 may evaluate RSSI values in comparison to one another to track the road user(s) 104 and to provide the relative locations, relative directions, and relative dynamics to track the attributes of the road user(s) 104 over a period of time in which the road user(s) 104 is continually detected within the surrounding environment of the vehicle 102. The VCD 108 may also utilize the tracked attributes to supplement the sensor data provided by the vehicle sensors 114 of the vehicle 102.

Figure 5:
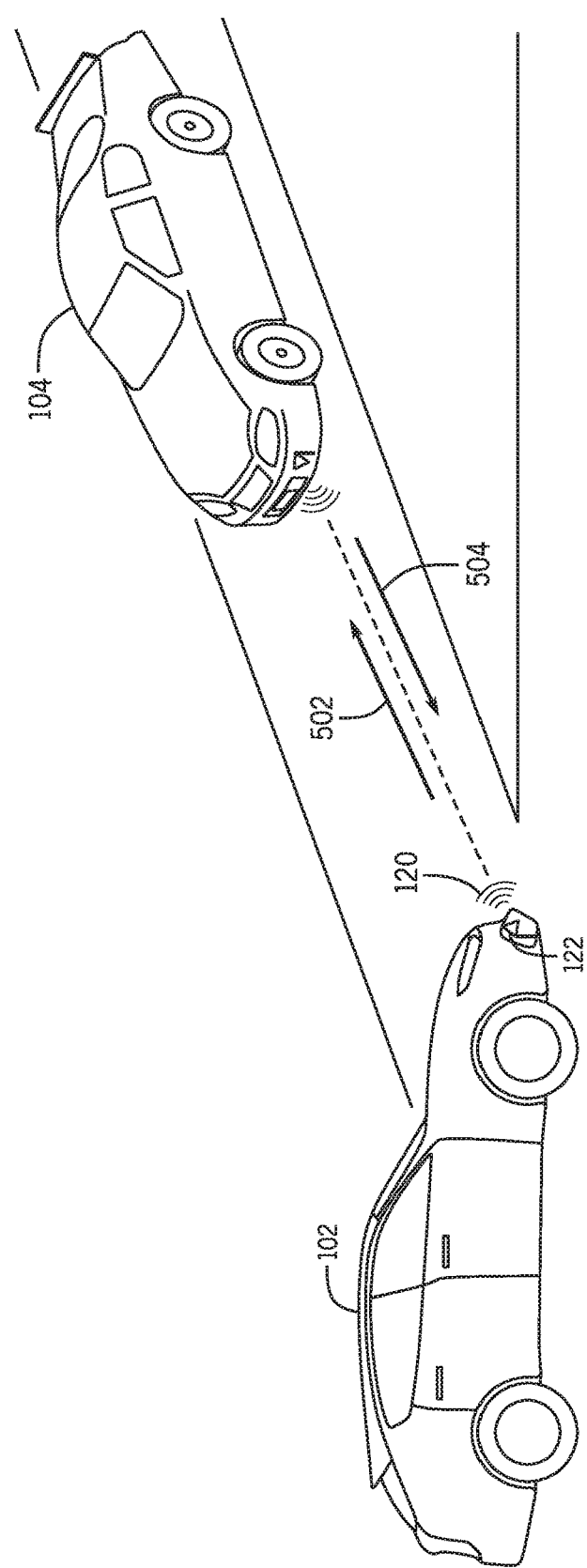
FIG. 5 is an illustrative embodiment of providing road user related data based on 5G vehicle communications according to an exemplary embodiment.

FIG. 5 is an illustrative embodiment of providing road user related data based on 5G vehicle communications according to an exemplary embodiment. As illustrated, upon the road user detection module 132 detecting the existence of the road user 104 within the surrounding environment of the vehicle 102, the signal strength determinant module 134 may communicate with the vehicle communication system 118 to position the directional antenna 122 towards the road user 104. Upon positioning the directional antenna 122, the 5G transceiver 120 may be controlled to send the vehicle communication signal 502 in the form of a beam towards the road user 104. As shown, the beam (e.g., full bream or portion of the beam) may be reflected back as the reflected vehicle communication signal 504 from the body of the road user 104. Upon being reflected back towards the vehicle 102, the directional antenna 122 may continue to be positioned in the direction of the road user 104 to thereby position the 5G transceiver 120 to receive the reflected vehicle communication signal 504.

As discussed above, upon receiving the reflected vehicle communication signal 504, the attribute determinant module 136 may analyze the reflected wireless communication signals and may determine data that pertains to attributes associated with the road user(s) 104 that are relative to the vehicle 102. Based on the data, the attribute determinant module 136 may determine locational attributes, directional attributes, and dynamic attributes that are relative to the vehicle 102 associated with the road user(s) 104 that may be provided to supplement sensor data provided by the vehicle sensors 114. The functionality of sending and receiving of the vehicle communication signals and the reflected vehicle communications via 5G transceiver 120 using the 5G communications band allows full duplex communication of the signals thereby allowing simultaneous sending and receiving of the signals by the 5G transceiver 120. This functionality may consequently enable efficient (e.g., very fast) determination of attributes associated with the road user(s) 104.

Figure 6:
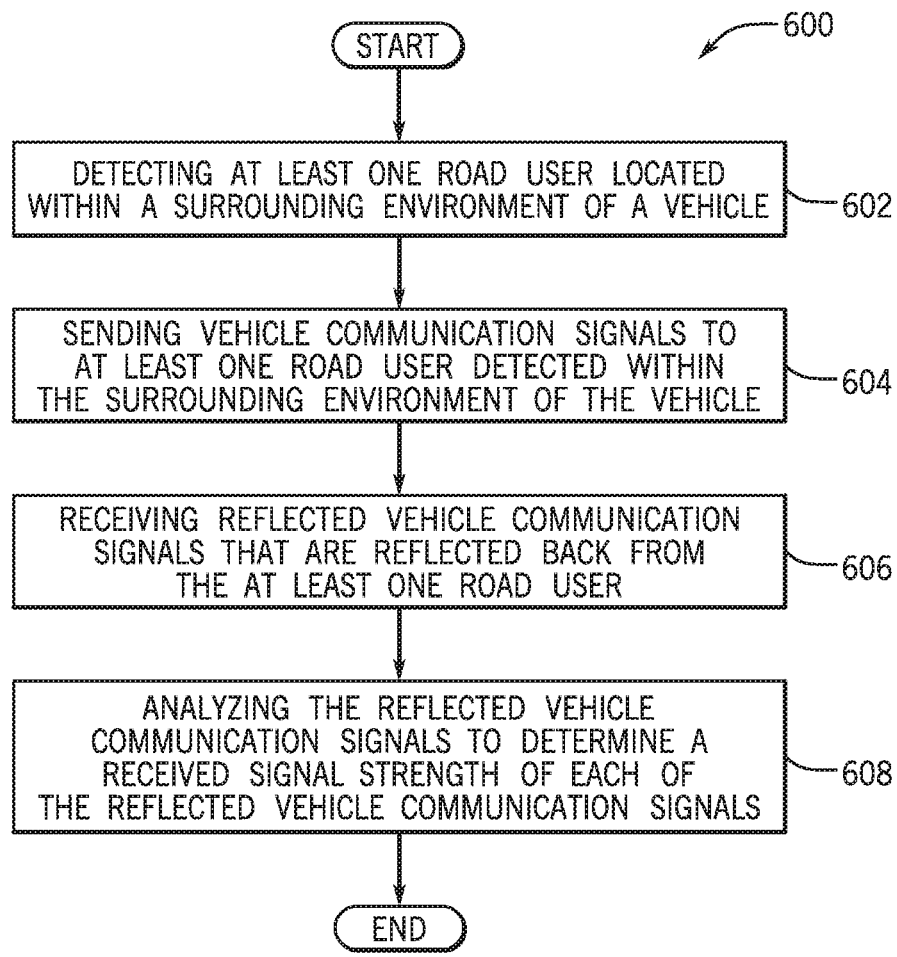
FIG. 6 is a process flow diagram of a method for providing road user related data based on vehicle communications according to an exemplary embodiment.

FIG. 6 is a process flow diagram of a method 600 for providing road user related data based on vehicle communications according to an exemplary embodiment. FIG. 6 will be described with reference to the components of FIG. 1 though it is to be appreciated that the method 600 of FIG. 6 may be used with other system and/or components. The method 600 may begin at block 602, wherein the method 600 includes detecting at least one road user 104 located within a surrounding environment of the vehicle 102.

The method 600 may proceed to block 604, wherein the method 600 may include sending vehicle communication signals to at least one road user 104 detected within the surrounding environment of the vehicle 102. The vehicle communications signals are sent from the vehicle through at least one vehicle communications transceiver 120. The method 600 may proceed to block 606, wherein the method 600 may include receiving reflected vehicle communication signals that are reflected back from the at least one road user 104.

The method 600 may proceed to block 608, wherein the method 600 may include analyzing the reflected vehicle communication signals to determine a received signal strength of each of the reflected vehicle communication signals. The received signal strength of each of the reflected vehicle communication signals are analyzed to determine attributes associated with the at least one road user 104 relative to the vehicle 102.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing road user related data based on vehicle communications, comprising:

detecting at least one road user located within a surrounding environment of a vehicle;

sending vehicle communication signals to the at least one road user detected within the surrounding environment of the vehicle, wherein the vehicle communication signals are sent from the vehicle by at least one vehicle communications transceiver through a vehicle communications network to be received by at least one road user to determine vehicle data associated with the vehicle, wherein the vehicle communication signals are also reflected off of a body of the at least one road user and are received by the at least one vehicle communications transceiver as reflected vehicle communication signals;

and analyzing the reflected vehicle communication signals to determine a received signal strength of each of the reflected vehicle communication signals, wherein the received signal strength of each of the reflected vehicle communication signals are analyzed to determine attributes associated with the at least one road user relative to the vehicle.

2. The computer-implemented method of claim 1, wherein detecting the at least one road user includes determining if at least one vehicle communication signal is received from the at least one road user, wherein upon determining if the at least one vehicle communication signal is received, the at least one vehicle communication signal is analyzed to determine a geo-tag associated with the at least one road user detected within the surrounding environment of the vehicle.

3. The computer-implemented method of claim 2, wherein sending the vehicle communication signals to the at least one road user includes evaluating the geo-tag associated with the at least one road user and positioning at least one directional antenna towards the at least one road user detected within the surrounding environment of the vehicle, wherein the at least one directional antenna is physically connected to the at least one vehicle communications transceiver.

4. The computer-implemented method of claim 3, wherein sending the vehicle communication signals to the at least one road user includes the at least one vehicle communications transceiver sending the vehicle communications signals as beams towards the at least one road user detected within the surrounding environment of the vehicle based on the positioning of the at least one directional antenna.

5. The computer-implemented method of claim 3, wherein receiving the reflected vehicle communication signals includes positioning the at least one directional antenna towards the at least one road user detected within the surrounding environment of the vehicle, wherein the enabled vehicle communications transceiver receives the reflected vehicle communication signals that are reflected back off of the body of the at least one road user based on the positioning of the at least one directional antenna.

6. The computer-implemented method of claim 1, wherein analyzing the reflected vehicle communication signals to determine the received signal strength of each of the reflected vehicle communication signals includes evaluating respective signal strengths of each of the vehicle communication signals sent to the at least one road user and using the respective signal strengths as respective baselines to calculate the received signal strength of each of the reflected vehicle communication signals.

7. The computer-implemented method of claim 1, wherein the received signal strength of each of the reflected vehicle communication signals are analyzed to determine location attributes associated with the at least one road user, wherein the locational attributes associated with the at least one road user are relative to the vehicle.

8. The computer-implemented method of claim 1, wherein the received signal strength of each of the reflected vehicle communication signals are analyzed to determine directional attributes associated with the at least one road user, wherein the directional attributes associated with the at least one road user are relative to the vehicle.

9. The computer-implemented method of claim 1, wherein the received signal strength of each of the reflected vehicle communication signals are analyzed to determine dynamic attributes associated with the at least one road user, wherein the dynamic attributes associated with the at least one road user are relative to the vehicle.

10. A system for providing road user related data based on vehicle communications, comprising:

a memory storing instructions when executed by a processor cause the processor to:

detect at least one road user located within a surrounding environment of a vehicle;

send vehicle communication signals to the at least one road user detected within the surrounding environment of the vehicle, wherein the vehicle communication signals are sent from the vehicle by at least one vehicle communications transceiver through a vehicle communications network to be received by at least one road user to determine vehicle data associated with the vehicle, wherein the vehicle communication signals are also reflected off of a body of the at least one road user and are received by the at least one vehicle communications transceiver as reflected vehicle communication signals;

and analyze the reflected vehicle communication signals to determine a received signal strength of each of the reflected vehicle communication signals, wherein the received signal strength of each of the reflected vehicle communication signals are analyzed to determine attributes associated with the at least one road user relative to the vehicle.

11. The system of claim 10, wherein detecting the at least one road user includes determining if at least one vehicle communication signal is received from the at least one road user, wherein upon determining if the at least one vehicle communication signal is received, the at least one vehicle communication signal is analyzed to determine a geo-tag associated with the at least one road user detected within the surrounding environment of the vehicle.

12. The system of claim 11, wherein sending the vehicle communication signals to the at least one road user includes evaluating the geo-tag associated with the at least one road user and positioning at least one directional antenna towards the at least one road user detected within the surrounding environment of the vehicle, wherein the at least one directional antenna is physically connected to the at least one vehicle communications transceiver.

13. The system of claim 12, wherein sending the vehicle communication signals to the at least one road user includes the at least one vehicle communications transceiver sending the vehicle communications signals as beams towards the at least one road user detected within the surrounding environment of the vehicle based on the positioning of the at least one directional antenna.

14. The system of claim 12, wherein receiving the reflected vehicle communication signals includes positioning the at least one directional antenna towards the at least one road user detected within the surrounding environment of the vehicle, wherein the enabled vehicle communications transceiver receives the reflected vehicle communication signals that are reflected back off of the body of the at least one road user based on the positioning of the at least one directional antenna.

15. The system of claim 10, wherein analyzing the reflected vehicle communication signals to determine the received signal strength of each of the reflected vehicle communication signals includes evaluating respective signal strengths of each of the vehicle communication signals sent to the at least one road user and using the respective signal strengths as respective baselines to calculate the received signal strength of each of the reflected vehicle communication signals.

16. The system of claim 10, wherein the received signal strength of each of the reflected vehicle communication signals are analyzed to determine location attributes associated with the at least one road user, wherein the locational attributes associated with the at least one road user are relative to the vehicle.

17. The system of claim 10, wherein the received signal strength of each of the reflected vehicle communication signals are analyzed to determine directional attributes associated with the at least one road user, wherein the directional attributes associated with the at least one road user are relative to the vehicle.

18. The system of claim 10, wherein the received signal strength of each of the reflected vehicle communication signals are analyzed to determine dynamic attributes associated with the at least one road user, wherein the dynamic attributes associated with the at least one road user are relative to the vehicle.

19. A non-transitory computer readable storage medium storing instructions that when executed by a computer, which includes a processor, perform a method, the method comprising:
  detecting at least one road user located within a surrounding environment of a vehicle;
  sending vehicle communication signals to the at least one road user detected within the surrounding environment of the vehicle, wherein the vehicle communication signals are sent from the vehicle by at least one vehicle communications transceiver through a vehicle communications network to be received by at least one road user to determine vehicle data associated with the vehicle, wherein the vehicle communication signals are also reflected off of a body of the at least one road user and are received by the at least one vehicle communications transceiver as reflected vehicle communication signals;
  and
  analyzing the reflected vehicle communication signals to determine a received signal strength of each of the reflected vehicle communication signals, wherein the received signal strength of each of the reflected vehicle communication signals are analyzed to determine attributes associated with the at least one road user relative to the vehicle.

20. The non-transitory computer readable storage medium of claim 19, wherein analyzing the reflected vehicle communication signals to determine the received signal strength of each of the reflected vehicle communication signals includes evaluating respective signal strengths of each of the vehicle communication signals sent to the at least one road user and using the respective signal strengths as respective baselines to calculate the received signal strength of each of the reflected vehicle communication signals.

* * * * *